United States Patent
Murata

(10) Patent No.: US 9,015,717 B2
(45) Date of Patent: Apr. 21, 2015

(54) METHOD FOR PROCESSING TASKS IN PARALLEL AND SELECTING A NETWORK FOR COMMUNICATION

(75) Inventor: Seiji Murata, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1609 days.

(21) Appl. No.: 12/108,598

(22) Filed: Apr. 24, 2008

(65) Prior Publication Data

US 2008/0271024 A1     Oct. 30, 2008

(30) Foreign Application Priority Data

Apr. 25, 2007   (JP) ................ 2007-116042

(51) Int. Cl.
*G06F 9/46* (2006.01)
*G06F 9/50* (2006.01)

(52) U.S. Cl.
CPC ...... *G06F 9/5027* (2013.01); *G06F 2209/5017* (2013.01); *G06F 2209/509* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,689,694 B2* | 3/2010 | Kato et al. | .............. | 709/226 |
| 7,907,515 B2* | 3/2011 | Fukasawa | .............. | 370/216 |
| 8,195,737 B2* | 6/2012 | Kato et al. | .............. | 709/201 |
| 2004/0174853 A1 | 9/2004 | Saito et al. | | |
| 2005/0091357 A1 | 4/2005 | Krantz et al. | | |

FOREIGN PATENT DOCUMENTS

| | | |
|---|---|---|
| JP | 530139 A | 2/1993 |
| JP | 2001209625 A | 8/2001 |
| JP | 2004272563 A | 9/2004 |
| JP | 2005130474 A | 5/2005 |

OTHER PUBLICATIONS

Japanese Office Action for corresponding Japanese application JP 2007-116042, Jul. 27, 2009.
Japanese Office Action for corresponding Japanese application JP2007-116042, Apr. 14, 2009.

* cited by examiner

*Primary Examiner* — Eric C Wai
(74) *Attorney, Agent, or Firm* — Matthew B. Dernier, Esq.; Gibson & Dernier LLP

(57) ABSTRACT

In a micro processor unit, when processing to be requested to another processor unit which connects via a network, occurs during task processing in a task processing unit in an application SPU, a communication controller in a PU specifies a network with which a processor unit, which is a request destination, connects. An interface selector in the application SPU selects one network included in the specified networks, with the view of communication capability or the like, and writes that information in a look-aside buffer. In case that processing for the same processing target is requested next time and after that, a system SPU or the PU transmits the processing request depending on required communication capability.

11 Claims, 12 Drawing Sheets

FIG.10

| OBJECT ID | NODE NUMBER |
|---|---|
| ID1 | NODE 1 |
| ID2 | NODE 2 |
| ... | ... |

| OBJECT ID | NETWORK INTERFACE |
|---|---|
| ID1 | FIRST_NETWORK_COMMUNICATOR@SYSTEM_SPU |
| ID2 | SECOND_NETWORK_COMMUNICATOR@PU |
| ... | ... |

104

METHOD FOR PROCESSING TASKS IN PARALLEL AND SELECTING A NETWORK FOR COMMUNICATION

BACKGROUND OF THE INVENTION

1. Field of the Invention

The present invention relates to technology for distributing processing to a plurality of computational resources to execute a computer program.

2. Description of the Related Art

The improvements in the functionality of software including computer games, web-searching software, or the like, is imposing a large processing load on hardware. To address such circumstances, it is important to improve efficiency of task processing using a plurality of processors as well as it is necessary to speed up operational processing itself.

In order to allow a plurality of processors to execute task processing in parallel, a main processor, which is responsible for managing a plurality of sub-processors, divides an application program into tasks, allocates the tasks to respective sub-processors, switches processing, controls an access from each sub-processor to a main memory or to an input/output device, etc. When, in such a manner, a plurality of sub-processors process tasks under centralized management by the main processor, sometimes, the overhead occurs. For example, when a plurality of sub processors issue access requests simultaneously, the main processor must execute a lot of processes at a time and executions might be stacked.

SUMMARY OF THE INVENTION

In this background, a general purpose of the present invention is to provide a technology where a plurality of processors can efficiently process tasks in parallel.

According to one embodiment of the present invention, an information processing apparatus is provided. The information processing apparatus comprises a plurality of task processing units operative to process tasks, which are originated from a program, in parallel, a management processing unit operative to manage task processing performed by the plurality of task processing units and to execute processing requested from the task processing unit, the processing including the establishment of communication with another apparatus which connects to a network, a communication processing unit operative to establish communication with another apparatus which connects to a network in correspondence to the request from the task processing unit, wherein, the task processing unit comprise a selector which selects a request destination for the establishment of communication from the management processing unit and the communication processing unit, depending on required communication capability.

The establishment of communication may merely represent generating a state where apparatuses are connected via a network or may include processing to send and receive signals or data while being connected.

According to another embodiment of the present invention, an information processing system is provided. The information processing system comprising a plurality of processor units connected via a network, wherein each processor unit comprises: a plurality of task processing units operative to process tasks, which are originated from a program, in parallel; a management processing unit operative to manage task processing performed by the plurality of task processing units and to execute processing requested from the task processing unit, the processing including the transmission of data to another processor unit; and a communication processing unit operative to transmit data to another processor unit in correspondence to the request from the task processing unit, wherein, the task processing unit comprises a selector which selects a request destination for the data transmission, from the management processing unit and the communication processing unit, depending on required transmission speed.

According to yet another embodiment of the present invention, an information processing method is provided. The information processing method comprising; issuing, to a management processing unit, a request for establishing communication with another apparatus, the request occurring when processing a task in a task processing unit, acquiring information on networks connecting to an apparatus which is the communication target of the request by the management processing unit, selecting one network to establish communication by the task processing unit, based on the information on networks, and establishing communication by a third processing unit, other than the management processing unit, the third processing unit being able to establish communication via the one selected network.

Optional combination of the aforementioned constituting elements, and implementations of the invention in the form of methods, apparatuses, systems and computer programs may also be practiced as additional modes of the present invention.

BRIEF DESCRIPTION OF THE DRAWINGS

FIG. 10 shows an exemplary data structure of an object ID cache stored in an object-ID-cache-storing area in the main memory according to the second embodiment;

FIG. 11 shows an exemplary data structure of a look-aside buffer provided in a local memory of an application SPU according to the second embodiment;

DETAINED DESCRIPTION OF THE INVENTION

The invention will now be described by reference to the preferred embodiments, This does not intend to limit the scope of the present invention, but to exemplify the invention.

First Embodiment

Figure 1:
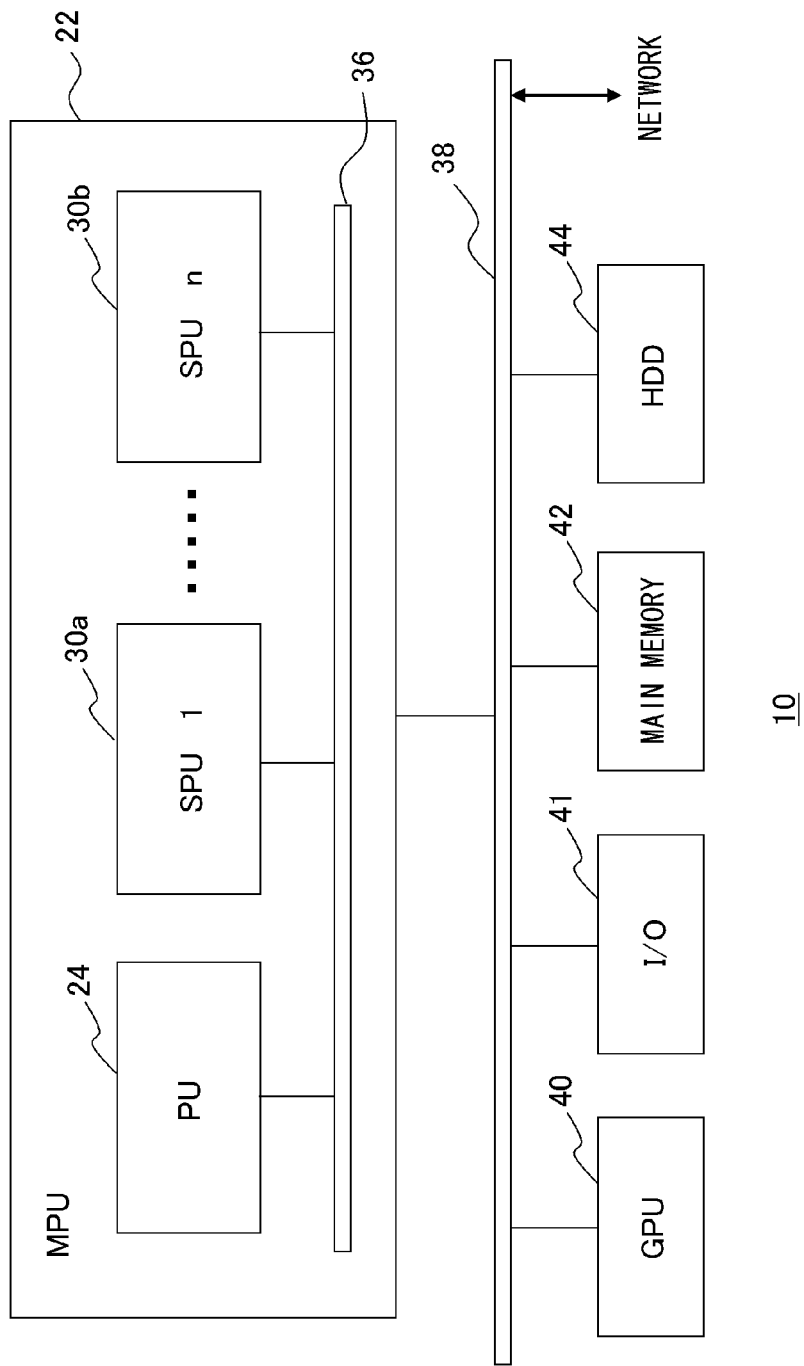
FIG. 1 shows an exemplary structure of an information processing apparatus according to a first embodiment.

FIG. 1 shows an exemplary structure of an information processing apparatus 10 according to the present embodiment. The information processing apparatus 10 comprises a micro processor unit (MPU) 22, a graphics processing unit (GPU) 40, an input/output apparatus (I/O) 41, a main memory 42, and an auxiliary storage device (HDD) 44. The respective elements are connected via a main bus 38. The information processing apparatus 10 is able to transmit and receive data to/from other information processing apparatuses via a network, e.g., a LAN, the Internet, or the like.

The MPU 22 is an asymmetric multi processor unit and comprises one managing unit (PU) 24 and processing units (SPU) 30a and 30b, the respective elements being connected via an inner bus 36 in the MPU 22. In addition to the processing of an OS (Operating system), the PU 24 acts as intermediary between the SPU 30a or the SPU 30b, and the GPU 40, the I/O 41, the HDD 44 or other information processing apparatuses being connected via a network, when sending and receiving data or processing request, etc, as will be described later. The SPU 30a and the SPU 30b are units which mainly execute application programs.

Although the function of the OS is mainly executed by the PU 24, a part of the function may be delegated to respective SPU 30a and SPU 30b. For example, the PU 24 may interprets script-code and break it down into a plurality of tasks, where the script code have been described beforehand while assuming that processing is performed in parallel. Then each SPU 30a and SPU 30b may process a task selected from those tasks autonomously, in its idle time. In this case, the function of the OS such as allocating tasks or scheduling, which should originally be performed by the PU 24, are delegated to each SPU 30a and SPU 30b. Then, the SPU 30a and the SPU 30b load a necessary program from, for example, the main memory 42 and start processing, accordingly.

Figure 2:
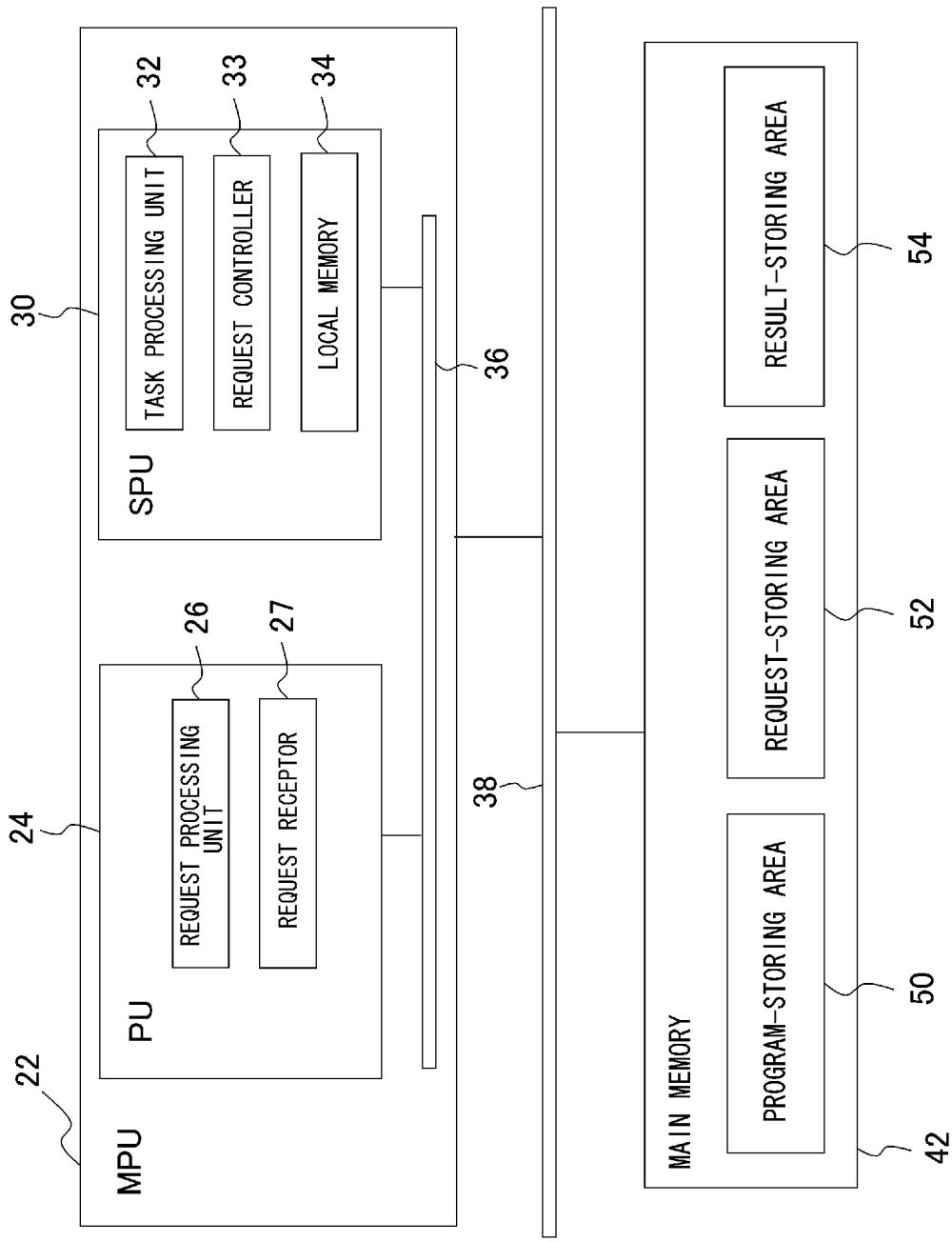
FIG. 2 shows a detailed structure of a PU, an SPU and a main memory according to the first embodiment.

FIG. 2 shows the structure of the PU 24, the SPU 30 and the main memory 42 in detail. Although a plurality of SPUs may be provided in the MPU 22 as shown in FIG. 1, only one SPU is shown here as the SPU 30 for simplicity. Also, respective units may comprise a functional blocks besides the blocks shown in FIG. 2. However, those blocks are omitted in FIG. 2. According to the present embodiment, when there occurs processing for which a request should be made to the PU 24, while the SPU 30 is processing a task, a processing request is issued to the PU 24. The "processing for which a request should be made to the PU 24" refers to processing which can be performed only by the PU 24, or the processing which is preferably performed by the PU 24 in relation to the improvement of efficiency in processing or scheduling.

Alternatively, a quantity which indicates amount of load to be processed by the SPU 30, such as the number of tasks to be processed by the SPU 30, amount of resources to be used, or the like, may be detected in real-time by using a known technique. And when the load exceeds the predetermined threshold value, a request may be made to the PU 24 to perform a part of the processing which should be processed by the SPU 30, originally. Therefore, the specifics of the processing to request is, for example, a request for image processing directed to the GPU 40, sending and receiving data to/from the I/O 41, securing and releasing a storage area in the main memory 42, reading and writing into/from the HDD 44, network communication via a network, or the like, but not limited to these. Hereinafter, these processing is referred to as external request processing.

The processing request issued by the SPU 30 is stored into the main memory 42 and is to be performed by the PU 24 which detects the processing request. Data or a returned value acquired by the PU 24 as the result of the processing is stored into the main memory 42. When detecting the results, the SPU 30, which issued the processing request, acquires the result and thus a series of external request processing is completed.

The PU 24 includes a request processing unit 26 which actually performs the requested processing, and a request receptor 27 which detects a processing request stored in the main memory 42. The SPU 30 includes a task processing unit 32, which processes an allocated task, a request controller 33, which issues processing request and acquires the result of external request processing, and a local memory 34 which stores a program on issuance of the processing request or acquisition of the result, or a program or data which is necessary to perform the task which is read from the main memory 42.

The main memory 42 includes a program-storing area 50, a request-storing area 52 and a result-storing area 54. The program-storing area 50 stores a program for allowing the PU 24 or the SPU 30 to execute each task in the request processing unit 26 or in the task processing unit 32, respectively. The request-storing area 52 stores a processing request issued by the SPU 30. The result-storing area 54 stores the result of processing performed by the PU 24. The program to be stored in the program-storing area 50 includes a library which is called by the SPU 30 in order to issue the processing request or to acquire the results. The request controller 33 in the SPU 30 and the request receptor 27 in the PU 24 can be activated by calling the respect library.

The blocks as shown in FIG. 2 may be implemented hardwarewise by elements such as a CPU, a memory, or other LSIs and softwarewise by a computer program which controls an access. Therefore, it will be obvious to those skilled in the art that the functional blocks may be implemented in a variety of manners by a combination of hardware and software and is not limited to any particular implementation. For example, the request processing unit 26, the request receptor 27, the request controller 33 and the task processing unit 32 may be threads processed in parallel in the PU 24 and the SPU 30, respectively.

When an external request processing occurs in a task being performed by the SPU 30, the PU 24 performs those processing according to the request from the SPU 30 and acquires the results. The result to be acquired may be any of; image data which is created as the result of the request for image processing directed to the GPU 40, data read from the HDD 44, data acquired as the result of network communication, and in addition to these, an address in the main memory 42 to store such data, a return value indicating whether the access completes normally or abnormally, or the like.

In an application program or the like performed by the SPU 30, is included a description for calling a library which corresponds to the function of the PU 24 described above, among libraries stored in the program-storing area 50 of the main memory 42. This enables the SPU 30 to activate the function of the PU 24.

The issuance of processing request from the SPU 30 to the PU 24, and the transmission of the processing result from the PU 24 to the SPU 30, are performed asynchronously via the main memory 42. After issuing the processing request, the SPU 30 continues performing another task. This prohibits the processing in the SPU 30 from stopping due to waiting for the acceptance by the PU 24 even if a lot of external request processing occurs at a time in one or a plurality of the SPUs 30. Further, by acquiring the result at a most appropriate time in terms of efficient scheduling in the SPU 30, the frequency of switching task contexts in the SPU 30 can be limited. And the total amount of time necessary for context switching can be reduced.

Meanwhile, comparing with the case where an interrupt signal on the processing request is received from the SPU 30, the PU 24 does not have to stop the task which has been being performed or does not have to recover the task, thus, the PU 24 can perform a plurality of processes efficiently. Further, by preparing a library which allows the SPU 30 to designate the function of the PU 24 directly, in advance, a program in a main body can be simplified. In a similar manner, in functions of the PU 24 which are prepared as libraries and which can be directly designated by the SPU 30, an accesses for devices besides MPU 22, i.e., the GPU 40, the I/O 41, the main memory 42, the HDD 44 or the like may be included. This enables to develop a generalized program which does not depend of the structure on devices.

Figure 3:
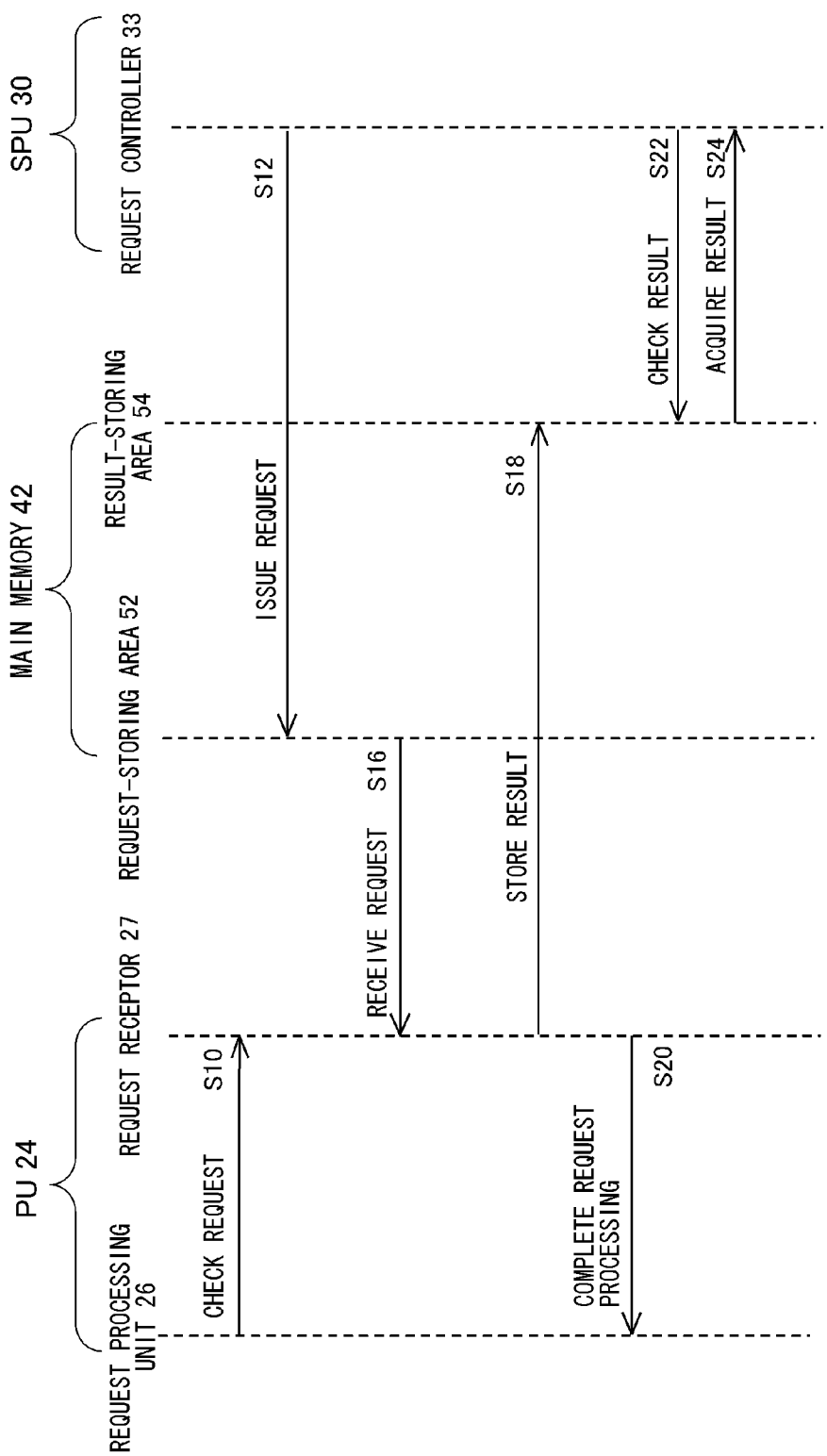
FIG. 3 is a time chart showing an exemplary procedure where external request processing is performed by respective functional blocks in the first embodiment.

An explanation on the operation implemented by the structure described above will be given in the following. FIG. 3 is a time chart showing an exemplary procedure where external request processing is performed by respective functional blocks. In FIG. 3, an acknowledgement signal which is sent out in response to the each transmitted signal, as appropriate, is omitted. Firstly, when, for example, the processing being processed is completed, the request processing unit 26 in the PU 24 checks whether or not a request is stored in the request-storing area 52 by notifying the request receptor 27 that it is possible to execute a next processing request (hereinafter referred to as a "request") (S10). If a new request has not been issued from the SPU 30 by the time, the request processing unit 26 goes into a stand-by state while monitoring the issuance. During this time, another task may be executed in the PU 24.

When an external request processing occurs in the task processing unit 32, the request controller 33 in the SPU 30 issues a request in accordance with the specifics of necessary processing and the request is stored into the request-storing area 52 of the main memory 42, accordingly (S12). The request includes a pointer indicating a region in the result-storing area 54 which stores the result of the processing to request, and the ID of a function which indicates the specifics of the processing to request. After storing the request, the SPU 30 may execute another task processing.

When detecting that the request is stored in the request-storing area 52, the request receptor 27 in the PU 24 executes acceptance processing, such as reading out the request, etc (S16). This allows the request processing unit 26 to start the requested processing.

When, for example, the request processing unit 26 completes the requested processing, the request receptor 27 stores the result, such as generated data, a return value or the like, into the region indicated by the pointer included in the request, in the result-storing area 54 in the main memory 42 (S18). Then the request receptor 27 notifies the request processing unit 26 of the completion of the processing for the request (S20). The request controller 33 in the SPU 30 checks whether or not the result of the processing, of which it made the request, is stored in the result-storing area 54 (S22). If stored, the request controller 33 acquires it by, for example, reading it to the local memory 34 (S24). Whether or not the result is stored, may be checked with the request receptor 27, instead of the step S22. When receiving the notification on the completion of the processing at step S20, the request processing unit 26 in the PU 24 performs the checks of step S10 for another request, as appropriate, at a preferable time, based on the scheduling of the other task processing or the like, and the subsequent processing is repeated.

According to the procedure described above, the SPU 30 can make the PU 24 perform external request processing occurring in its task processing and can acquire the results.

If a request has been stored in the request-storing area 52 before the checking of the request at step S10, the PU 24 may accept the request instead of going to standby state. Further, if the results has not been stored in the result-storing area 54 when checking the result in step S22, the SPU 30 may go into the standby state until the result is stored. Meanwhile, the task processing unit 32 in the SPU 30 can execute other task processing.

Although, a description on the processing procedure in the SPU 30 and the PU 24, in case where one SPU 30 issues one request, is given above, a similar processing is performed in case where a plurality of SPUs 30 issue requests. That is, if one SPU 30a has issued a request and the processing corresponding to the request is being executed in the PU 24, and if another SPU 30b issues another request right after that, the subsequent request is stored into the request-storing area 52 (S30). Then, until the processing is started in response to the latter request in the PU 24 and the result thereof is stored into the request-storing area 52, the request controller 33 in the SPU 30b which issued the latter request is in the standby state while monitoring the result. Meanwhile, another task may be processed in the SPU 30b.

Further, in case where another SPU 30 issues a request, a plurality of requests are stored in the request-storing area 52, the request controller 33 in each SPU 30 which issued the request is in the standby state until the result is stored in an individual region in the result-storing area 54. Meanwhile, another task may be processed in each SPU 30.

Figure 4:
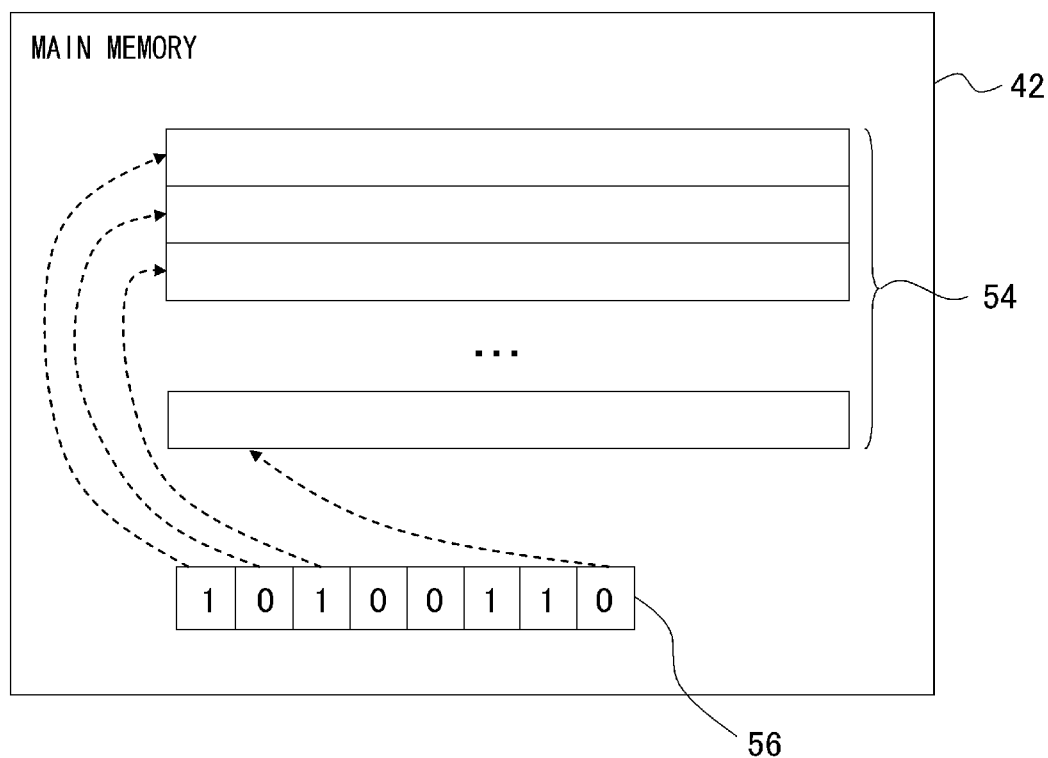
FIG. 4 schematically shows an example of the first embodiment in case where a flag-storing area is provided in a main memory.

Under such circumstances, in order to use the main memory 42 efficiently, after the result, which is stored in a certain region in the result-storing area 54, is read by the SPU 30 which made the request, it is preferable that the result of another request can be stored in that storage region. For this purpose, a flag-storing area may be further provided in the main memory 42. FIG. 4 schematically shows an exemplary embodiment where the flag-storing area is provided in the main memory 42. In FIG. 4, the program-storing area 50 and the request-storing area 52 are omitted.

As shown in the FIG. 4, the main memory 42 includes a flag-storing area 56 in addition to the result-storing area 54. The flag-storing area 56 is a region which stores a bit sequence indicating flags corresponding to issued requests, respectively. Therefore, the number of total bits of the flag-storing area 56 is the number of the requests which can be issued simultaneously. Alternatively, the number of the bits may be increased or decreased in real time, based on the number of the issued requests. The result-storing area 54 has an individual region corresponding to each bit of the flag-storing area 56 and the result for one request is stored in each individual region. In FIG. 4, the individual regions in the result-storing area 54 are shown as rectangles and its correspondence with respective bits of flag-storing area 56 is shown by arrows with dashed lines.

In this case, the request issued by the SPU 30 includes an address of the flag-storing area 56 and a bit position therein. For example, assume that when a flag is "0", it is possible to store the result of a new request and when the flag is "1", the result which has not been read is being stored. In such a case, for a request to issue, one of the bit positions of which the flag is "0", is specified. And when the request controller 33 in the SPU 30 is to check whether or not the result is stored, it checks whether the flag of a position, which is specified in the request, becomes "1".

The request receptor 27 in the PU 24 stores the result, which is processed by the request processing unit 26, into a region in the result-storing area 54 which corresponds to the specified bit position and set the flag of the bit position as "1". The request controller 33 in the SPU 30 confirms that the flag has become "1", then acquires the results from the corresponding region in the result-storing area 54 and changes the flag to "0" again, accordingly. This enables to promptly reuse regions in the result-storing area 54, the regions having been used before, when issuing another request. Thus the regions in the main memory 42 can be saved.

Figure 5:
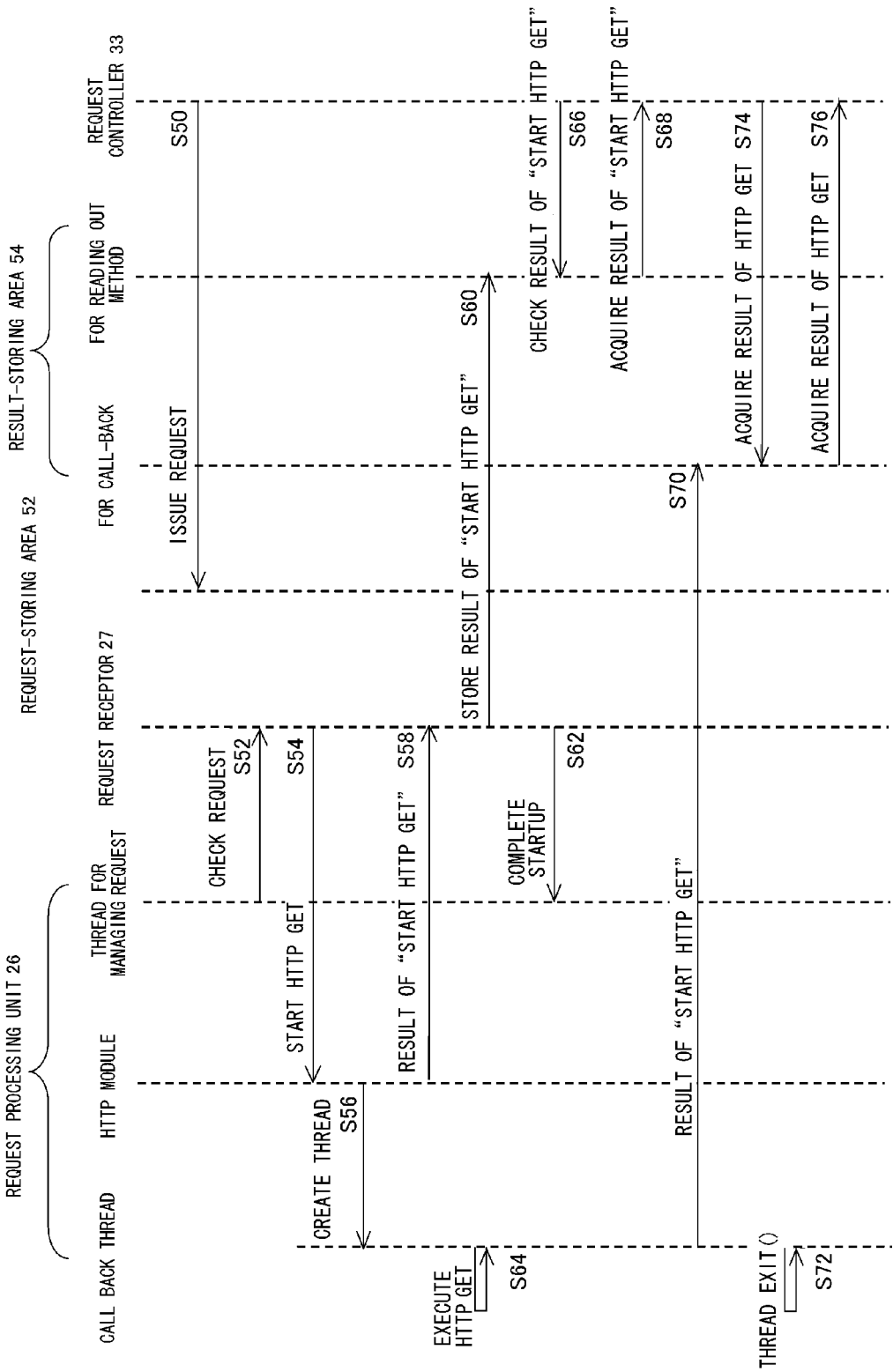
FIG. 5 is a time chart showing an illustrative embodiment of the operation in the information processing apparatus according to the first embodiment.

FIG. 5 is a time chart showing an illustrative embodiment of the operation in the information processing apparatus 10 described above. In FIG. 5, a case is shown where, in response to the request from the SPU 30, the PU 24 issues a "HTTP GET" method and acquires data on a web page via a network. In this case: a) a request managing thread which manages the completion of request processing and the existence of a request; b) a HTTP module which controls processing on HTTP; and c) a call-back thread which executes respective call-back processing are performed in the request processing unit 26. In the result-storing area 54: a) a region for reading and loading a method, the region storing the results of calling the method; and b) a region for call-back, the region storing data acquired by the call-back are provided.

Firstly, the request controller 33 in the SPU 30 issues a request while including, in the request, necessary information such as an ID that are allocated to the "HTTP GET" method in advance, a URI, or the like (S50). The request is stored in the request-storing area 52 in the main memory 42. The managing thread of the request processing unit 26 in the PU 24 checks with the request receptor 27 whether or not the request exist, when, for example, the previous request is completed (S52). When detecting a request stored in the request-storing area 52, the request receptor 27 activates the "HTTP GET" method by passing information on the request to the HTTP module in the request processing unit 26 (S54).

The HTTP module creates a call-back thread based on the information on the request (S56). When the thread is created normally, the HTTP module notifies the request receptor 27 of that (S58). When a thread is not created normally, a return value indicating an error is returned. However, an explanation on the following error processing will be omitted here. The request receptor 27 stores the notified results in the region for reading and loading a method provided in the result-storing area 54 in the main memory 42 (S60), and notifies the request managing thread in the request processing unit 26 of the completion of the startup processing for the request (S62). Meanwhile, the call-back thread in the request processing unit 26 is performing the "HTTP GET", based on the URI specified by the request (S64).

The request controller 33 in the SPU 30 checks whether the result for the startup of the "HTTP GET" is stored in the region for reading and loading a method in the result-storing area 54 (S66) and if stored, acquires the result (S68). Meanwhile, when desired data can be acquired by the "HTTP GET" method, having been performed in the step S64, the call-back thread in the request processing unit 26 stores the data in the region for call-back in the result-storing area 54 (S70) and leaves the method (S72).

The request controller 33 in the SPU 30 checks whether or not the data which is the result of the "HTTP GET" is stored in the region for call-back in the result-storing area 54 (S74) and if stored, acquires it (S76). The above procedure enables the SPU 30 to acquire data on the desired web page and, based on the data, to continue processing the task which has requested the processing.

According to the present embodiment described above, when a necessity for external request processing occurs in the SPU, which executes the task processing, the request thereof is stored temporarily in the main memory. The PU, which executes the external request processing, reads the processing request from the main memory, when it can process a new request, and executes the processing, accordingly. This allows the processing load on the PU to be distributed even if a number of requests come at a time. Thus a task other than the processing requested by the SPU (e.g., the execution of the OS or the like) gets stacked less frequently. In a similar manner, the results of the external request processing is stored in the main memory temporarily. Therefore, after issuing the processing request and before acquiring the result of the processing, the SPU can put the task which needs the result of the processing into the standby state and can continue processing other tasks. As a result, an occurrence of overhead is restricted both in the PU and the SPU.

Further, by setting information identifying the specifics of processing which can be executed by the PU, in advance, the processing is performed in the PU by merely specifying the identification information when a processing is requested. This enables to simplify a program which is executed in the SPU. Further, programs which interpret the identification information are equally provided as a library, regardless of processing types. By this, the processing related to the processing request is abstracted. Thus, by setting a library in accordance with the circumstances, e.g., the structure of devices or the like, it becomes possible to provide a versatile application program.

Further, using the flag, it is determined whether or not data is read out from the region for storing the processing result and, in the region from which the data has been read out, the result of the subsequent processing request is stored. This allows to implement the present embodiment without securing a vast area in the main memory.

The Second Embodiment

In the first embodiment, the processing unit makes the processing request to the managing unit in the information processing apparatus which comprises the single micro processor unit including the managing unit and the processing unit. When requesting processing, the processing in the request destination can be started by calling a library and by specifying a function. Further, the issuance of the processing request and the transmission of the processing results are performed asynchronously between the request source and the request destination. According to the present embodiment, also in a state where a plurality of micro processor units are connected via a network, the processing request via a network is implemented by calling a library in a similar manner. Also in this case, the issuance of the processing request and the transmission of the processing results are performed asynchronously. By this, the task processing in each micro processor unit is performed more efficiently and thus, the parallel performance is improved.

Figure 6:
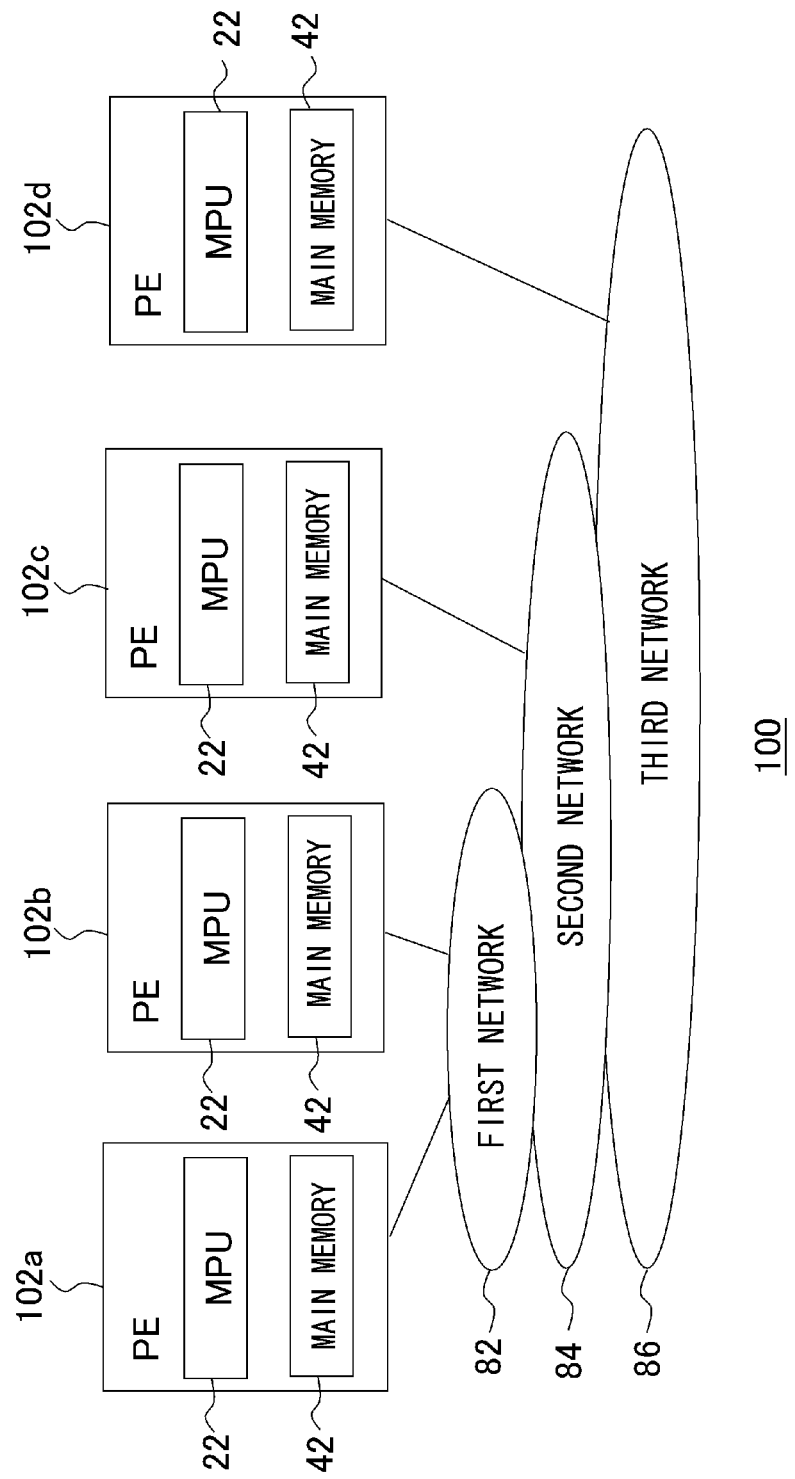
FIG. 6 shows a structure of an information processing system according to a second embodiment.

FIG. 6 shows a structure of the information processing system according to the present embodiment. The information processing system 100 includes a plurality of processor elements (PE) 102a, 102b, 102c and 102d. Although the number of PEs is assumed to be four, it may be increased or decreased depending on a purpose or the size of the information processing system 100. A plurality of PEs 102a, 102b, 102c and 102d include the MPU 22 and the main memory 42 shown in FIG. 1 in the first embodiment, respectively. The PEs 102a, 102b, 102c and 102d may further include processing units, such as, a GPU, an I/O, an HDD or the like and an inner bus or a main bus which connects those units. However, they are omitted in FIG. 6. As shown in FIG. 1, The MPU 22 includes the PU 24 and the SPUs 30a and 30b. Nevertheless, the number of SPUs 30a and 30b may differ among PEs 102a, 102b, 102c and 102d.

By way of an example, the information processing system 100 shown in FIG. 6 has a network structure where; two PEs of the PEs 102a, 102b, 102c and 102d, i.e., PEs 102a and 102b are connected to a first network 82, a second network 84 and a third network 86, another PE 102c is connected to the second network 84 and the third network 86 and the other PE 102d is connected only to the third network 86. PEs communicate among each other via one of the networks to which the PEs connect. Although in FIG. 6, three networks, i.e., the first, the second and the third networks are shown, the number of the networks is not limited to three. The transmission speed is high in the order of the first network 82, the second network 84 and the third network 86, in contrast, the connectivity is low in the same order. For example, the first network 82 can be provided as a network of PCI☐Peripheral Component Interconnect☐, InfiniBand or GbE (Gigabit Ethernet (Ethernet is a registered trademark)), the second network 84 can be provided as a network which communicates directly using IP (Internet Protocol) and the third network 86 can be provided as a network using NAT (Network Address Translation), etc.

According to the present embodiment, a SPU 30 or the like in one PE 102a issues a processing request to another PE 102b, 102c or 102d. In the multi-core environment like the information processing system 100, generally, independent OSs manage the schedule of task processing or the like, respectively. In such a circumstance, comparing with the information processing apparatus 10 which comprises a single MPU 22 as shown in the first embodiment, it is significantly more difficult to estimate the time needed for the results of the processing request to return after the processing request is issued.

In addition, since the PE 102a and the PEs 102b, 102c and 102d transmit the processing requests or results via a network, extra transmission time is required to complete the processing request. Further, since the plurality of PEs 102a, 102b, 102c and 102d share common networks, the time required to transmit data is likely to be increased, depending on the amount of data to be transmitted. In this case, if the transmission of the processing request or the results is synchronized between the request source and the request destination, longer standby time is required, compared with the first embodiment. Further, since a transmission pathway is long, the risk of trouble is high. If a trouble occurs, another task which is being processed in the request source or the request destination, might get stacked in order to perform processing which handles an error. Therefore, in the multi-core system as shown in FIG. 6, overheads are likely to occur in the whole system.

By applying the asynchronous issuance of the processing request and the asynchronous transmission of the results, as shown in the first embodiment, to the information processing system 100, more significant effect can be obtained, compared with the first embodiment. The processing to request may be processing which can be executed only by the PU 24 or the SPU 30 in one of other PEs 102b, 102c or 102d, which is the request destination. Alternatively, the processing may be a processing that should be primarily processed by the SPU 30a, which is the request source, but a request for processing is made to one of other PEs 102b, 102c and PE 102d because the processing load of the SPU 30a excesses the predetermined threshold value. In the latter case, if the processing load excesses the threshold value in the SPU 30 in one of the PEs 102b, 102c and 102d, which are the request destinations, the PU 24 included in such PEs 102b, 102c and 102d issues a processing request to another PE. Thus, the distributed processing is achieved autonomously across the whole processor units included in the information processing system.

In the information processing system 100 with the network structure as described above, in case where a processing request is made from one PE 102a to one of the other PEs 102b, 102c and 102d, it is necessary to select an appropriate network. To do so, in addition to the processing performed in the first embodiment, it is necessary to acquire the type of network connecting with the processing request destination, i.e., the PE 102b, 102c or 102d and to select the appropriate network based on the specifics of processing to request or the like.

For example, when a processing request is made from the PE 102a to the PE 102c or the PE 102d, it is necessary to discriminate a network via which the request can be transmitted since it can not be transmitted via the first network 82. When a processing request is made from the PE 102a to the PE 102b, although both elements connect to the same networks of three types, by selecting an appropriate network and communicating via the network, the processing efficiency can be improved as a whole. For example, the first network 82 is selected for the processing which requires high speed and the third network 86 is selected for the processing which requires high speed to a lesser degree.

However, in a structure commonly used traditionally, when a necessity occurs in the SPU 30 in one PE 102a to communicate with another PE 102b or the like, the PU 24 in the PE 102a, to which the SPU 30 belongs to, initially accepts the communication request and establishes the communication with the communicated destination via a network selected by solving the problem associated with networks as described above. Even if applying the asynchronous processing request described in the first embodiment to such structure, processing for taking care of the networks might heavily load the PU 24, which results in considerable burden on the PU 24 and insufficient outcome. According to the present embodiment, processing on the selection of a network and the transmission is distributed to units other than the PU 24, thus, the burden on the PU 24 is decreased. Synergy between this and the asynchronous processing request, improves the processing efficiency in the entire system.

Figure 7:
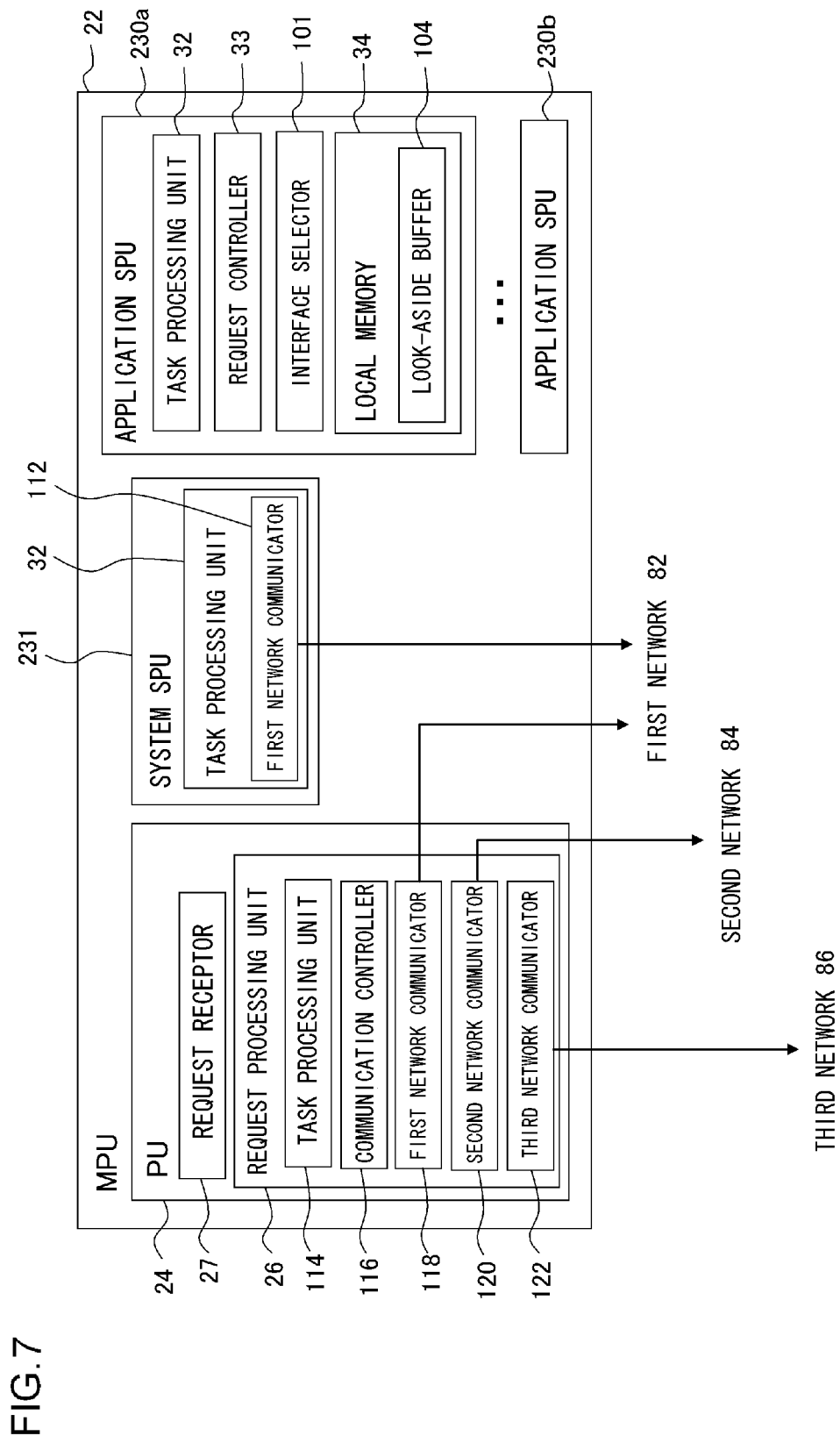
FIG. 7 shows the detailed structure of an MPU in a PE according to the second embodiment.

FIG. 7 shows the detailed structure of the MPU 22 in the PE 102a according to the present embodiment. On the similar structure as shown in the first embodiment, the same symbol is labeled and the explanation is omitted as appropriate in FIG. 7 and FIG. 8. According to the present embodiment, two types of SPUs, i.e., application SPUs 230a and 230b and a system SPU 231 are provided in addition to the PU 24 in the MPU 22. The application SPU 230a and 230b correspond to the SPU 30 in the first embodiment and mainly execute application programs.

In addition to the task processing unit 32 and the request controller 33, the application SPU 230a includes a interface selector 101 which executes processing associated with the selection of a network when issuing the processing request via the network. Furthermore, the local memory 34 in the application SPU 230*a* includes, in addition to the region for loading a program or storing necessary data (not shown) as with the first embodiment, an object-ID-look-aside buffer (hereinafter, simply referred to as a "look-aside buffer") 104 which retains a network interface, selected before, for respective processing to request. The detailed description on the function of the interface selector 101 and the look-aside buffer 104 will be given later.

Although the application SPU 230*b* may have a similar structure as the application SPU 230*a*, the structure of the application SPU 230*b* is not shown in the FIG. 7. In addition, the explanation will be given on the operation of the application SPU 230*a*, the explanation also representing that of the application SPU 230*b*.

The system SPU 231 which is newly provided in the present embodiment includes the task processing unit 32 in a similar manner as with the application SPU 230*a*. Furthermore, the task processing unit 32 includes a first network communicator 112 as shown in FIG. 7. The system SPU 231 transmits the processing request which is issued from the application SPU 230*a* to an external PE, as a task processing to be performed by itself, via the first network communicator 112. In this process, the processing request transmitted by the first network communicator 112 is limited to those that are sent via the first network 82. This corresponds to the processing which requires high-speed communication among the processing requests made from the PE 102*a* to the PE 102*b*, in the example shown in FIG. 6. That is, the first network communicator 112 functions as a network interface to the first network 82.

The numbers of application SPUs 230*a*, application SPUs 230*b* and system SPUs 231 are not limited to those shown in FIG. 7. For example, three separate system SPUs executing transmission via the first network 82, the second network 84 and the third network 86, respectively, may be provided. Alternatively the system SPU 231 may be configured so that one system SPU 231 can transmit to more than two networks. Further, since the system SPU 231 functions as a network interface by processing one of the tasks of the task processing unit 32, the system SPU 231 may have the same structures as the application SPU 230*a*, in practice. That is, among the plurality of application SPU 230*a*, application SPU 230*b*, or the like, one application SPU may function as the system SPU 231.

In addition, the PU 24 according to the present embodiment includes the request receptor 27 and the request processing unit 26 as with the first embodiment, however, the request processing unit 26 includes a communication controller 116, a first network communicator 118, a second network communicator 120 and a third network communicator 122. Any of the first network communicator 118, the second network communicator 120 and the third network communicator 122 functions as a network interface when the application SPU 230 makes a request for processing to an external PE. The first network communicator 118 performs transmission via the first network 82, the second network communicator 120 performs transmission via the second network 84 and the third network communicator 122 performs transmission via the third network 86.

The communication controller 116 specifies the node in the PE of the destination for each processing request, specifies a network to which the request destination connects, etc, and controls the transmission processing by sorting out the processing requests to the first network communicator 118, the second network communicator 120 and the third network communicator 122. In the present embodiment, by enabling to skip the processing on networks as much as possible in the PU 24, the load of processing in the PU 24 is reduced. Other than these, the request processing unit 26 in the PU 24 includes the task processing unit 114 which executes the external request processing sent by the application SPU 230*a* to the PU 24, in the similar manner as described in the first embodiment.

The system SPU 231 according to the present embodiment performs processing which is simpler than the processing on networks which is described above and performed by the PU 24. That is, only the processing request of which destination node is specified beforehand and which is found to be suitable for being transmitted via a particular network, which is the first network 82 in the example of FIG. 7, is sent to the system SPU 231 and transferred. This allows the system SPU 231 to implement real time communication which can be estimated, in high speed. Meanwhile, the PU 24 can perform all the processing on networks including specification of a network, etc. In addition, the PU 24 has functions as a general-purpose processor which performs processing besides the processing on networks.

The interface selector 101 in the application SPU 230*a* selects a network among networks connecting to the PE to which the processing request is made and which are specified by the communication controller 116 in the PU 24, based on required communication speed. Further, in case where a plurality of network interfaces exist which can perform communication with the network, the interface selector 101 selects a network interface based on whether or not real-time communication is required.

In the example of FIG. 6, in case that the request destination is the PE 102*c*, one network is selected from the second network 84 and the third network 86. However, since an interface which can communicate with the networks is limited to the one which is included in the PU 24 in FIG. 7, the second network communicator 120 or the third network communicator 122 in the PU 24 will be the network interface. On the other hand, in case that the request destination is the PE 102*b* and the first network 82 is selected, since there exist two interfaces which can perform communication with the network, i.e., the first network communicator 118 in the PU 24 and the first network communicator 112 in the system SPU 231, one of the interfaces is selected.

Information on the selected network interface is stored in the look-aside buffer 104 in the local memory 34. This allows the PU 24 to skip processing such as specifying the node of the PE which is the request destination or specifying the network which is connected with the request destination and allows the interface selector 101 to skip processing such as the selection of a network and a network interface, etc, when a processing request for the same processing target is to be executed next time. Further, in case where the first network communicator 112 in the system SPU 231 is selected as a network interface, the PU 24 does not have to perform the transmission processing itself. This reduces the processing load burdened on the PU 24 and furthermore, enables to select real time communication or non-real-time communication, based on the specifics of the processing request.

Figures 8, 9:
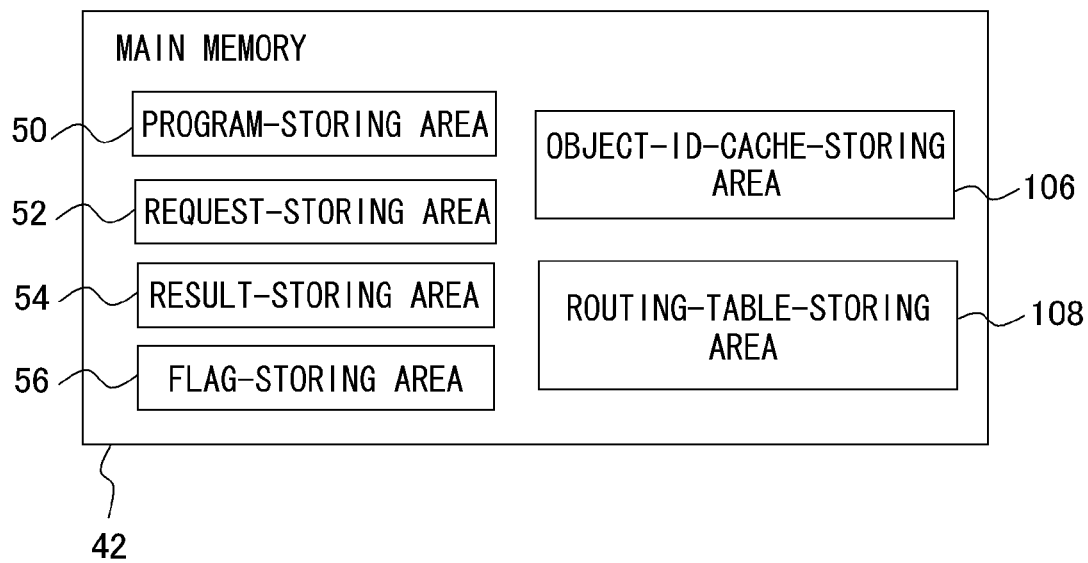
FIG. 8 shows the detailed structure of a main memory in the PE according to the second embodiment.
FIG. 9 shows an exemplary data structure of a routing table stored in a routing-table-storing area in the main memory according to the second embodiment.

FIG. 8 shows the structure of the main memory 42 in the PE 102*a* according to the present embodiment in detail. The main memory 42 includes an object-ID-cache-storing area 106 which stores object ID cache and a routing-table-storing area 108 which stores a routing table, in addition to the program-storing area 50, the request-storing area 52, the result-storing area 54 and the flag-storing area 56 shown in the first embodiment.

When the application SPU 230a issues the processing request to an external PE, information, which identifies the processing target to request on software, is specified and a library is called. The "processing target" here may be any units made by dividing a target of processing on software in accordance with some sort of rule and may be, what is called, an "object". The "processing target" corresponds to some sort of unit of hardware, for example, a memory which stores program code to execute the processing, a device to be processed, or the like. Then the application SPU 230a implements the processing on the "processing target" by making a processing request to the PE which includes the corresponding hardware. Hereinafter, the information which identifies the processing target is referred to as an "object ID".

The PU 24 which accepts the request for the transmission of the processing request using the library, refers to the routing table stored in the routing-table-storing area 108 and specifies the node number of a PE, which is the request destination and which corresponds to the object ID, and a network which is connected to the destination. Further the PU 24 associates the specified node number of the request destination and the object ID with each other and stores into the object-ID-cache-storing area 106 as an object ID cache. For the object ID entered in the object ID cache, since the node number and the network being connected has been already specified, the specification processing of the information can be skipped henceforth.

FIG. 9 shows an exemplary data structure of the routing table stored in the routing-table-storing area 108 in the main memory 42. The routing table 130 includes a node-number field 132, a network field 134 and a local-node-ID field 136. In the node-number field 132, node numbers which are uniquely given to the PEs 102a, 102b, 102c and 102d, respectively, and which indicate the position are recorded. In the network field 134, the types of the networks which connect to the PEs 102a, 102b, 102c and 102d are recorded. When a plurality of networks are being connected, all of the networks are recorded. In the local-node-ID field 136, for each network recorded in the network field 134, a local node ID for identifying each node in the network is recorded.

The routing table 130 may be stored into, for example, an external storage or the like in advance and read out into the main memory 42. Alternatively, the routing table 130 may be restructured by reading the inner setting of respective PEs 102b, 102c and 102d when, for example, the information processing system 100 is started.

As described above, when the communication controller 116 in the PU 24 transfers the processing request from the application SPU 230a, the communication controller 116 refers to the routing table 130 and acquires information on a network being connected to the PE which is the request destination. The node number of the request destination required in this process is acquired using existing techniques based on the object ID specified by the application SPU 230a which is the request source. For example, inquiries are made to another PE which manages the correspondence between the object IDs and the node numbers, the correspondence is listed and a search is performed, transmission to another PE is performed actually and when the request arrives, via transfer through the PE, at the PE which corresponds to the targeted object ID, information on the node is received from the PE etc. Alternatively, these technologies may be combined depending on the distance to the request destination, or the like.

FIG. 10 shows an exemplary data structure of the object ID cache stored in the object-ID-cache-storing area 106 in the main memory 42. The object ID cache 140 includes an object-ID field 142 and a node-number field 144. In the object-ID field 142, the object IDs of the processing requests issued in the past are recorded. In the node-number field 144, the node numbers of the PE which is the request destination and which corresponds to each object ID is recorded. The object ID cache 140 is updated every time the communication controller 116 in the PU 24 acquires the node number of a node which is the request destination corresponding to a new object ID as described above. In case that processing request for the same object ID has not occurred for a determined period, the object ID cache 140 may be overwritten.

FIG. 11 shows an exemplary data structure of the look-aside buffer 104 stored in the local memory 34 in the application SPU 230a. The look-aside buffer 104 includes an object ID field 152 and a network-interface field 154. In the object ID field 152, the object IDs of the processing request issued in the past are recorded. In the network-interface field 154, information, which identifies the network interface selected by the interface selector 101 in response to each processing request, is recorded. Also in the look-aside buffer 104, entries on the object ID which is not referred to for a long period may be overwritten.

A multi-stage processing on networks, such as the specification of the node of the request destination using the object ID, the specification of the network which connects to the request destination, the selection of network and network interface and the transmission of the processing request as described above, is provided as the same library. This allows individual network to be abstracted in the side of an application program processed in the application SPU 230a and allows the library to perform an appropriate routing automatically. The application SPU 230a can perform the processing request by merely setting an object ID and calling a library without considering the position where the PE exists, the PE being the request destination, in the network when processing task of an application.

Figure 12:
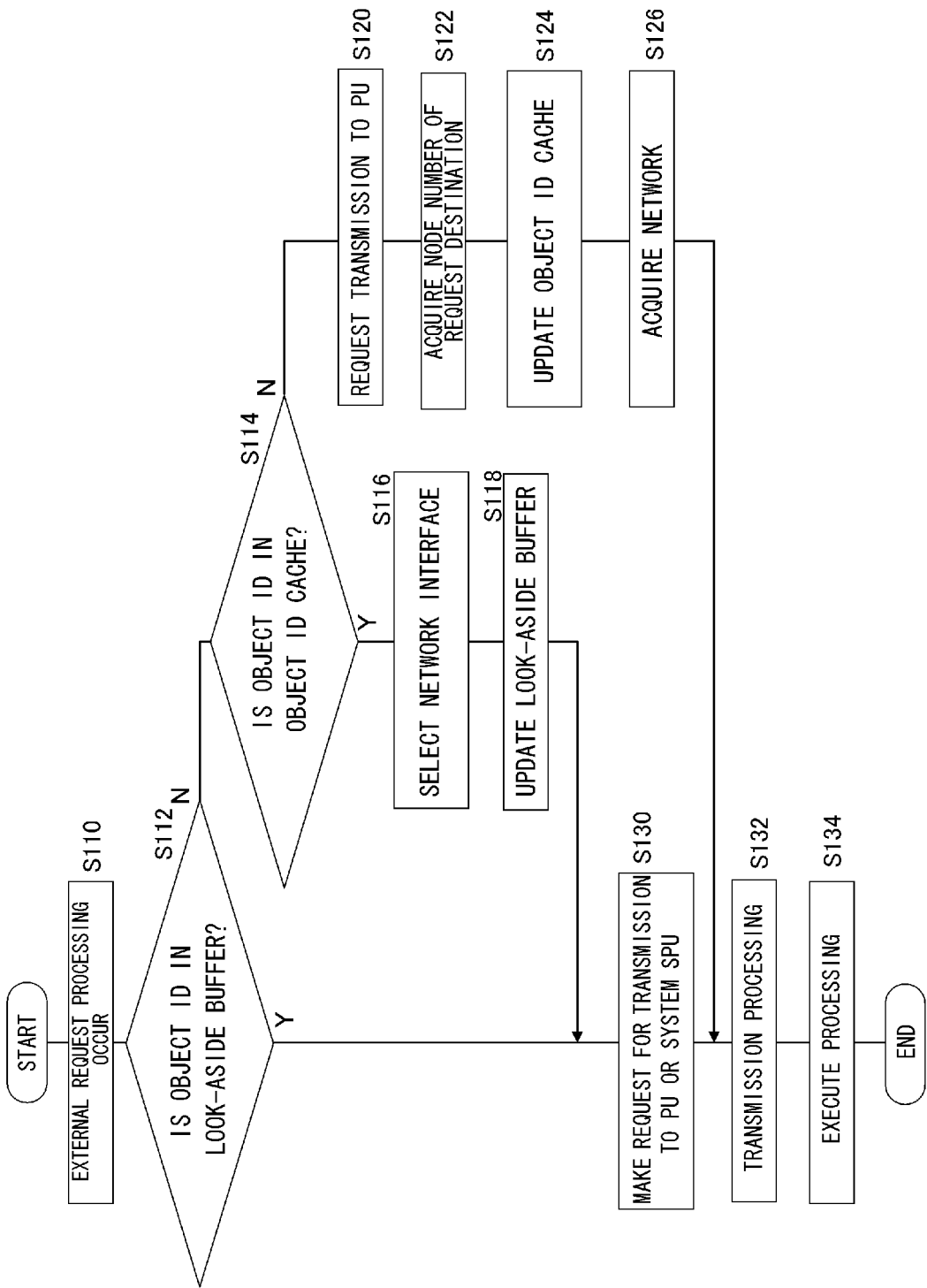
FIG. 12 is a flowchart showing a processing procedure for transmitting of a processing request when an external request processing occurs in a SPU according to the second embodiment.

FIG. 12 shows a processing procedure for transmission of the processing request when the processing for external request to the PE 102b occurs in the application SPU 230a in the PE 102a. Firstly, when the external request processing occurs (S110), the request controller 33 in the application SPU 230a refers to the look-aside buffer 104 in the local memory 34 and checks whether or not the object ID of the processing to request has been entered (S112). The object ID may be the one acquired when the communication with the PE corresponding to the object ID was established or may be selected from ones listed in the main memory 42 or a shared memory in the information processing system 100 or the like. A state where an object ID is not entered in the look-aside buffer 104 occurs, in case that the processing request for the object ID was not performed in the past or in case the object ID had not been referred to for a long period and was overwritten.

In case the object ID is not entered in the look-aside buffer 104 (N in S112), the request controller 33 checks whether or not the object ID is entered in the object ID cache 140 stored in the main memory 42 (S114). In case the object ID is not entered (N in S114), i.e., in case where the processing request for the same object ID has not made in the past or in case where the object ID had not been referred to for a long period and was overwritten, the request controller 33 issues the transmission request for the processing request to the PU 24, while specifying the object ID (S120). This processing is performed asynchronously as with the first embodiment. By this, the transmission request is stored in the request-storing area 52.

At this point, information, identifying that the transmission request is directed for the PU 24, may be included in the transmission request. Alternatively, the transmission request may be stored in the region provided for the exclusive use of the PU 24 in the request-storing area 52, so that the PU 24 can detect the request.

When the request receptor 27 in the PU 24 detects that the transmission request is stored in the request-storing area 52, firstly, the communication controller 116 in the request processing unit 26 in the PU 24 acquires the node number of the PE 102b to which the processing request is directed, based on the object ID, using commonly-used method (S122). Then the communication controller 116 records the object ID and the node number thus acquired, associated with each other, in the object ID cache stored in the object-ID-cache-storing area 106 in the main memory 42 (S124).

Next, the communication controller 116 in the PU 24 refers to the routing table 130 in the routing-table-storing area 108, acquires information on the network connecting to the PE 102b to which the processing request is directed and the local node ID thereof (S126) and transmits the processing request (S132). In case where the processing request is transmitted in order to acquire the node number of the PE 102b also in the step S120, only the update of the object ID cache may be performed in the step S122. Through this process, the object ID of the processing request are entered with the node number in the object ID cache 140.

Hereinafter, In performing the processing request for the same object ID, the object ID has been entered in the object ID cache 140 (Y in 114). In this case, the interface selector 101 in the application SPU 230a which makes the processing request refers to the object ID cache 140 and the routing table 130, acquires information on the network connecting to the PE 102b, which is the processing-request destination, and selects an appropriate network and a network interface for transmitting the processing request, based on the transmission speed or the like (S116). Then the interface selector 101 writes the correspondence between the object ID and the selected network interface into the look-aside buffer 104 (S118).

Subsequently, the request controller 33 issues the transmission request to the block which the selected network interface belongs to (S130) as with the case where the object ID has been entered in the look-aside buffer 104 from the beginning (Y in S112). In the example shown in FIG. 7, since the network interface exists in the system SPU 231 or the PU 24, the transmission request is stored in a region exclusively provided for the system SPU 231 or the PU 24 in the request-storing area 52 in the main memory 42. Alternatively, information which identifies the system SPU 231 or the PU 24 is included in the processing request.

In detecting that the transmission request is stored in the request-storing area 52, the system SPU 231 or the PU 24 performs the transmission request (S132). In this process, the processing request transferred by the system SPU 231 arrives at the system SPU 231 in the PE 102b which is the request destination. The processing request transferred by the PU 24 arrives at the PU 24 in the PE 102b, which is the request destination. By this, the PU 24 in the PE 102b does not have to perform receiving processing for the processing request transmitted by the system SPU 231.

The processing request arriving at the PE 102b which is the request destination, is executed in the application SPU 230a or the like in the PE 102b and the result is returned via the same network if necessary (S134). In this process, the result of the processing request transmitted by the system SPU 231 is returned from the system SPU 231 in the PE 102b which is the request destination to the system SPU 231 in the PE 102a which is the request source. This enables to complete the processing request and the acquisition of the processing results for that processing request, without the involvement of the PU 24.

Figure 13:
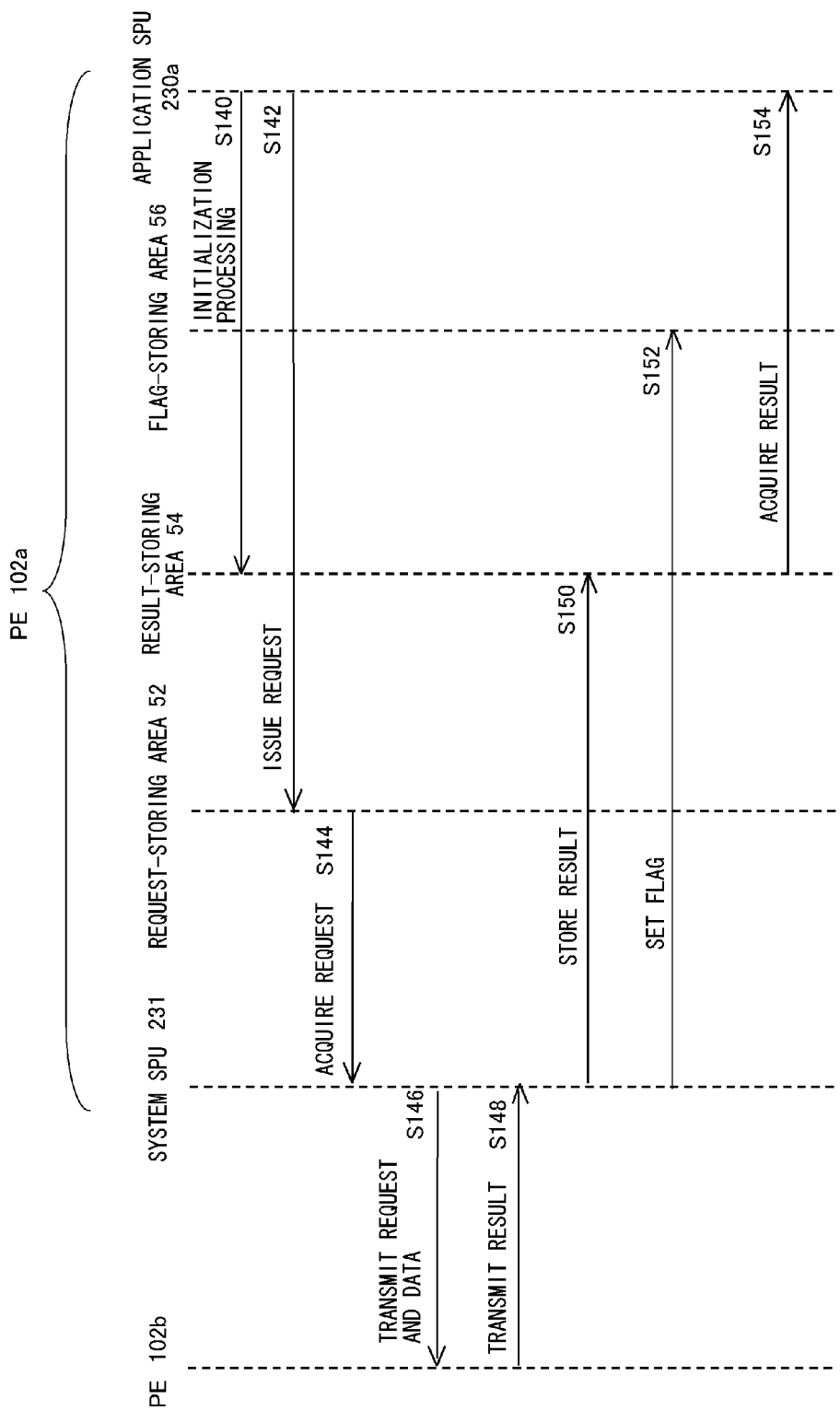
FIG. 13 is a time chart showing an exemplary procedure in case a processing request is made by the application SPU in a PE to another PE, according to the second embodiment.

FIG. 13 is a time chart showing an exemplary procedure in case the processing request is made by the application SPU 230a in the PE 102a to another PE 102b according to the mechanism as described thus far. In the network structure shown in FIG. 6, PE 102b connects to the first network 82 and in FIG. 7, the system SPU 231 includes the first network communicator 112 which performs communication to the first network 82. Therefore, it is assumed that the first network communicator 112 in the system SPU 231 is selected as a network interface and recorded in the look-aside buffer 104. However, the present embodiment is not limited to the structure and it is also possible to replace the system SPU 231 with the PU 24.

Since the detailed processing procedure for the issuance and the acceptance of the request, for example the procedure whereby the system SPU 231 or the application SPU 230a goes into standby state while monitoring the request or the result of the processing, is similar to that of the first embodiment, it is omitted in FIG. 13. Further, each functional block in the application SPU 230a and the system SPU 231 are comprehensively shown in the application SPU 230a and in the system SPU 231 respectively. In a similar manner, the element which performs the requested processing is represented by the PE 102b comprehensively, although the element is, for example, the application SPU 230a in the PE 102b which is the request destination.

Firstly, when an external request processing occurs during a task processing, the application SPU 230a of the request source performs the initialization processing such as determining a region to use in the result-storing area 54 in the main memory 42 by checking the flag, etc. as described in the first embodiment (S140). Next, the application SPU 230a issues a request according to the specifics of necessary processing and stores the request in the request-storing area 52, accordingly (S142).

The request includes a pointer indicating the region in the result-storing area 54 which stores the result of processing, an ID which indicates the specifics of the processing to request and an object ID. The specifics of the processing may be discriminated by differentiating functions themselves which are called. If the request is, for example data processing in the processing-request destination, or the like, and it is necessary to transmit the data to the request destination, the data may be stored in sequence into a data storing region (not shown) provided besides the request-storing area 52 in the main memory 42. In this case, the request includes the address of the region where the data to be transmitted is stored, the size of the data, or the like.

When detecting that the request is stored in the request-storing area 52, the system SPU 231 in the PE 102a starts processing for transmitting the request (S144) and transmits the request to the PE 102b which is the request destination (S146). In case the data to be transmitted to the processing-request destination is stored in the data storing region in the main memory 42, the data is also transmitted using RDMA, or the like.

If the result of the processing is transmitted from the PE 102b which is the request destination (S148), for example when the processing-request destination completes the requested processing, the system SPU 231 in the PE 102*a* which made the request stores the result in the result-storing area 54 in the main memory 42 (S150). At the same time, the flag in the flag-storing area 56 explained in the first embodiment is updated so that the application SPU 230*a* can recognize that the result is stored (S152). Upon learning that the flag in the flag-storing area 56 is updated, the application SPU 230*a* acquires the processing result from the region corresponding to the flag, in the result-storing area 54 (S154). The operation described above enables to make the processing request to another PE 102*b* connected via network and to acquire the result thereof.

Also in this case, the issuance and the transmission of the request, and the transmission and the acquisition of the result are performed asynchronously in the application SPU 230*a* which issued the request and the system SPU 231 which transfers the request, as with the first embodiment. Therefore, the application SPU 230*a* or the system SPU 231 can process another task while another unit is performing the processing on the request. This enables effective scheduling. Further, in case that an request is issued to the request destination to which the request has been issued once, the selection of network is completed in the application SPU 230*a* and the transmission processing is performed by the system SPU 231 according to the specifics of the processing to request. Thus the number of pieces of processes, which should be performed by the PU 24, is reduced significantly. As a result, the PU 24 can process an OS or the like more efficiently.

Figure 14:
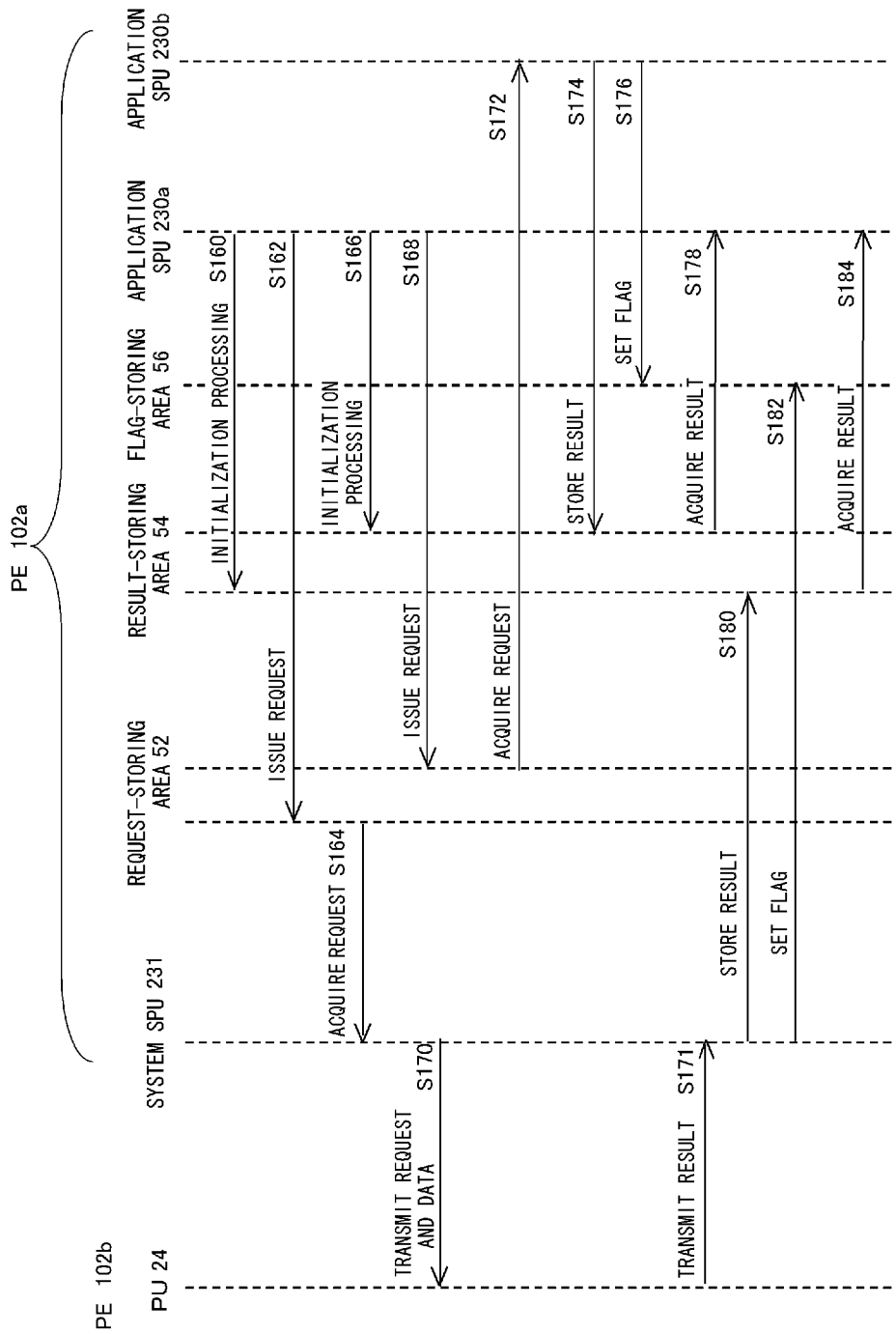
FIG. 14 is a time chart showing an exemplary procedure in case where the processing request from an application SPU in a PE, directed to another PE via a network and a local processing request, directed to another application SPU in the same PE are executed in parallel, according to the second embodiment.

The processing of the present embodiment can be performed in parallel with the processing request closed in a single MPU 22, which is described in the first embodiment. FIG. 14 is a time chart showing an exemplary procedure where the processing request made by the application SPU 230*a* in the PE 102*a* to another PE 102*b* via a network and a local processing request to another application SPU 230*b* in the same PE 102*a* are executed in parallel. The application SPU 230*a* can implement an embodiment suitable for respective circumstances by selecting the processing request via a network or the local processing request, based on the specifics of the processing to request, an acceptable time to acquire the result, or the like and by conveniently using the suitable one.

The order of the issuance of the request or the order of storing the results shown in FIG. 14 are given as an example only and the order changes according to actual circumstances. The application SPU 230*b* of the local processing-request destination may be a PU 24. This case is similar to the first embodiment.

When a processing, which should be delegated to an external element via a network, occurs during task processing, the application SPU 230*a*, which is the processing-request source, performs initialization processing, such as, determining a region to be used in the result-storing area 54 in the main memory 42, etc. in a similar manner as with FIG. 13 (S160) and stores the request in the request-storing area 52 (S162), accordingly. In detecting that the request is stored in the request-storing area 52, the system SPU 231 in the PE 102*a* starts processing for transmitting a processing request specified in the request (S164). Then the system SPU 231 sends the request or the data to the PE 102*b* which is the request destination (S170).

Meanwhile, when processing, which should be delegated to another application SPU 230*b* in the PE 102*a*, occurs in the application SPU 230*a* which is the processing-request source, the application SPU 230*a* determines a region to use other than the region which is used in the previously-issued request via a network and performs initialization processing (S166). Then the application SPU 230*a* stores the request in the request-storing area 52 (S168). The location for storing the request is different from the location for the previously-issued request, as a matter of course. When detecting that the request is stored in the request-storing area 52, the application SPU 230*b* which is the processing-request destination, starts processing according to the schedule of the application SPU 230*b*, by, for example, loading a program for implementing functions specified in the request from the main memory 42 (S172).

The application SPU 230*b*, which is the request destination, stores the result in the region in the result-storing area 54 specified by the request, when, for example the requested processing completes (S174). And at the same time the application SPU 230*b* updates the corresponding flag in the flag-storing area 56 (S176). When detecting the update of the flag in the flag-storing area 56, the application SPU 230*a*, which is the request source, acquires the processing result from the corresponding region in the result-storing area 54 (S178).

Meanwhile, when the result of the processing is transmitted from the PE 102*b*, to which the request is transmitted via a network (S171), the system SPU 231 in the PE 102*a*, which is the request source, stores the result into the region specified by the request in the result-storing area 54 (S180). At the same time, the corresponding flag in the flag-storing area 56 is updated (S182). When detecting the update of the flag in the flag-storing area 56, the application SPU 230*a*, which is the request source, acquires the processing result from the corresponding region in the result-storing area 54 (S184).

When performing the processing request which is closed in the PE 102*a*, only the procedure itself shown in the first embodiment have to be performed. And it is not necessary to call a library which performs processing on object IDs or the selection of networks. This enables to cut-down the processing time without performing extra processing.

By the procedure described above, regardless of whether the processing request is performed via a network or the processing request is performed inside the MPU 22, the application SPU 230*a* issues a request if necessary, and after the issuance, the application SPU 230*a* can process another task. Then, the result can be acquired at a time point that enables efficient scheduling. Also in the system SPU 231, which transmits the request, or in the application SPU 230*a* in the PE 102*b* which is the request destination, the request can be acquired at a convenient time to improve efficiency. Further, the PU 24 in the PE 102*a*, which is a request source, does not even have to perform the transmission processing itself in some cases.

Since the system SPU 231, which transmits the request, and the application SPU 230*b*, to which the local processing request is made, update the flag-storing area 56 when storing the result, the same bit sequence in the flag-storing area 56 may be shared. This allows the application SPU 230*a*, which is the processing-request source, to recognize the storing of the result without distinguishing whether it is the result obtained via the network or the result obtained in the same PE 102*a*. In consequence, it is restricted that a higher priority is given to the acquisition of one result, than the other results or the other tasks, despite the intention. This enables to implement parallel processing in higher performance across the whole information processing system 100.

The procedural steps, that are performed after recognizing the flag in the flag-storing area 56 till acquiring the result, is set in the library. This allows to select a desired embodiment, for example, acquiring two results at the same, the results being stored in the result-storing area 54, or acquiring the results in stored order, etc.

According to the present embodiment, when the external request processing occurs, the issuance and the acceptance of the processing request are performed asynchronously by providing the request-storing area in the main memory. In addition the transmission and the acquisition of the processing result are performed asynchronously by providing the result-storing area in the main memory. This allows the processing request to be performed at the preferable timing for minimizing the context switches according to the schedule in the application SPU, which is the processing-request source, the application SPU in the PE, which is the request destination, the PU or the system SPU which transmits the request, or the like. Thus the overhead across the whole system can be reduced. Further, by calling a library which is prepared in advance, the processing-request source can specify the specifics of the processing to request in an abstracted form. Thus the application program, which is the request source, can be simplified and the generalized program, which does not depend on device structures, can be created. In the similar manner, the present embodiment can be implemented without depending on the management form of the task processing which respective PEs perform inside.

Also for the processing request via network, the most preferable network and network interface are selected by the library. This enables the most preferable processing via network with a small number of procedures even if the structure of the network interface is changed. In a commonly-used system, a PU manages the network communication concentrically. Therefore, when data is transmitted via a network, the initiation of the transmission is likely to delay due to, for example, waiting for the processing turn in the PU, etc. On the other hand, according to the present embodiment, for the request destination, to which once the processing request was issued, the processing on the selection of the network can be skipped at the next issuance of the processing request, by memorizing the most preferable network interface in the local memory in the application SPU, which is the request source. Thus the processing request can be transmitted in shorter time.

Further by providing a system SPU which is partly responsible for the transmission processing, the network interface, to which the transmission request is made, can be selected from the system SPU or the PU, according to the specifics of the processing requested by the application SPU, etc. For example in case where the processing is desired to be performed in a high speed, by allowing the system SPU to transmit the processing request without the involvement of the PU, the real time communication is made possible without the occurrence of waiting time for processing in the PU. As a result, non-real-time communication via the PU and the real-time communication without the PU can coexist. Thus the flexible communication structure, which utilizes the network characteristics, can be implemented. Furthermore, the transmission processing performed by the PU can be reduced, thus the processing load on the PU is further reduced.

By providing the system SPU as an intermediate element of the PU and the application SPU, the processing load on the PU can be reduced, as well as library code to be read out in the application SPU is restricted from increasing. Thus, a negative impact, which accompanies with the processing distribution, on the application SPU can be minimized.

In addition, parameters on a low level device layer, for example, the position of the PE, which is the request destination, in the information processing system, a network which performs communication, or the like, are managed at a user level, using the object ID which does not depend on the position. This enables to skip the processing for changing layers from an application layer to a device layer, the processing being required when performing network communication, as well as to describe the processing on the network in the application program, which is the request source, without depending on the position. Therefore, at the developing stage of the application program, the processing via network can be implemented only with the description on the object ID and the library without considering the structure of the system which performs the program. Therefore, the program, which is able to perform versatile distributed processing, can be created easily.

Furthermore, in the application SPU or the like, by issuing the processing request when the processing load excesses the threshold value, concentration of loads on a certain application SPU is averted. In a similar manner, by issuing the processing request in the PE, which is the processing-request destination, the distributed processing is achieved autonomously across the whole processor units included in the information processing system, which allows parallel processing with higher performance. In the application program, since the specification of the processing-request destination is managed only by the object ID, it is possible to change the actual request destination which corresponds to one object ID in the library which is called. This enables, for example, to select a processor unit with less load as the request destination automatically, without detailed setting in the application program.

For the processing request via a network and for the processing request to another SPU in a single PE, the same mechanism can be used, thus a single apparatus comprising a single MPU can be easily developed into an information processing system comprising a multi-core structure. Furthermore, by providing, for example, the flag-storing area as a common architecture, the result can be received at the similar priority rate regardless of whether or not it is performed via a network. This enables parallel processing with high performance, which does not depend on the position.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, the object ID cache illustrated in the second embodiment may be set dynamically by the PU which executes the library. For example, in case where the processing load is increased in a certain PE, which is the request destination, it may be changed so as to set a plurality of nodes in correspondence with one object ID. In the SPU, which is the request source, requests are managed only with object IDs, and the object IDs do not depend on the positions. Therefore, even with such a change in the settings, the processing request is performed in a similar fashion. This enables to avert the concentration of processing load and to achieve more efficient processing.

On the other hand, the position information, such as a node number or the like, may be included in the object ID. In this case, by using a routing table or the like, processing for acquiring the number of a node, which is the request destination, can be skipped. This embodiment is effective in an environment, which does not involve the change of nodes, for example the reconstruction of PEs in the information processing system 100. A similar effect as described in the present embodiment can be achieved with a lower cost.

What is claimed is:

1. An information processing apparatus comprising:
a shared memory;
a processor unit, including:

a plurality of processing units operative to process, in parallel, a plurality of respective tasks, which originate from a program stored in the shared memory; and a management processing unit operative to manage the plurality of processing units, wherein the management processing unit comprises:
a request processing unit operative to perform processing requests issued by the processing units, and
a request receptor which detects said processing requests, wherein each of the processing units comprises:
a task processing unit for processing an allocated task,
a request controller for issuing processing requests and acquiring the result of said requests,
a local memory which stores a program configured to issue the processing request or acquire the results,
wherein said task processing unit may execute tasks while the request controller issues processing requests and waits for the results of said processing requests, and
a selector, which selects a specific network among available networks for the establishment of communication to a destination depending on communication capability required by the management processing unit; and a local memory containing a buffer that holds a network interface for a specific network among the available networks utilized by the information processing apparatus, wherein said local memory comprises:
a program-storing area, which stores a program for allowing the management processing unit to execute each processing request via the request processing unit and for allowing the processing units to execute each task via the task processing unit, wherein said program comprises a library which is called by one or more of said processing units in order to issue processing requests or acquire the results of said requests,
a request-storing area, which stores a processing request issued by one or more of said processing units, and
a result-storing area, which stores the results of processing performed by the management processing unit, wherein a flag indicates whether the results have been read by the request controller thereby allowing new results to be stored therein, wherein the management processing unit is operative to establish communication with the other information processing apparatus, upon the processing request by the task processing unit, by the request processing unit connecting to the other information processing apparatus via the specific network, and wherein, when a processing request is made by the task processing unit specifying the specific network and the destination for establishment of communication, communication is established through the network interface to the specific network, bypassing the management processing unit.

2. The information processing apparatus according to claim 1, wherein, the specific network, via which the request processing unit can establish communication, is a part of a network system via which the management processing unit can establish communication.

3. The information processing apparatus according to claim 1, wherein, the management processing unit, through the request processing unit, establishes communication with the other information processing apparatus, upon receiving the request for processing by the task processing unit, and transfers the request for processing by the task processing unit to the other information processing apparatus, accordingly.

4. The information processing apparatus according to claim 3, wherein
the request processing unit comprises a communication controller, which specifies the available networks that are connected with the other information processing apparatus corresponding to the destination for the request for processing,
wherein the destination is specified by the task processing unit as identification information; and
the selector in the task processing unit selects the specific network, based on the required communication capability, from the available networks specified by the communication controller, and
the selector selects the destination for the establishment of communication from the request processing unit, which is capable of establishing communication via the specific network selected.

5. The information processing apparatus according to claim 4,
wherein the communication controller stores into the shared memory network information, which associates the specific network and the identification information of the destination with each other, and
wherein the selector in the task processing unit acquires the specific network by the communication controller by referring to the network information based on the identification information on the destination.

6. The information processing apparatus according to claim 1,
wherein the task processing unit stores the request for the establishment of communication into the shared memory, while specifying the destination of the request for processing, and
wherein the request processing unit of the destination accepts the request for establishment of communication by reading the request for the establishment of communication from the shared memory.

7. An information processing system comprising:
a plurality of processor units connected via a network, operative to process, in parallel, a plurality of respective tasks, which originate from a program; and
a management processing unit operative to manage the plurality of processing units wherein the management processing unit comprises:
a request processing unit operative to perform processing requests issued by the processing units and transmit data from one processor unit to another processor unit, wherein the request processing unit may make a data transmission to the other processor unit of a task among the plurality of tasks when a processing unit among the plurality of processing units makes a request for processing to the management processing unit, and
a request receptor which detects said processing requests, wherein each of the plurality of processing units comprises:
a task processing unit for processing an allocated task,
a request controller for issuing processing requests and acquiring the result of said requests,
a local memory which stores a program configured to issue the processing request or acquire the results, wherein said task processing unit may execute tasks while the request controller issues processing requests and waits for the results of said processing requests, and a selector, which selects a specific network among available networks for the establishment of communication to a destination depending on communication capability required by the management processing unit; and a local memory containing a buffer that holds a network interface for a specific network among the available networks utilized by the information processing apparatus, and wherein, when a request for processing is made by the task processing unit specifying the specific network and the destination for establishment of communication, communication is established through the network interface to the specific network, bypassing the management processing unit.

8. The information processing system according to claim 7, wherein the data transmitted by the request processing unit is acquired by a respective request processing unit included in the processor unit to which the data is transmitted.

9. The information processing system according to claim 7, wherein:

the selector selects one network among one or more networks that connect with the processor unit in which the selector is contained to which the data is transmitted, depending on the required transmission speed; and the selected network for transmission is specified when the task processing unit makes a request to the request processing unit for the transmission of the data.

10. The information processing system according to claim 7, wherein data that is returned in response to the data transmission, from the other processor unit, which is a transmission destination of the data transmission requested by the task processing unit, is stored into a memory, wherein the data that is returned in response to the data transmission is the same as data of a result of processing that is performed by the management processing unit when requested by the task processing unit within the same processor unit, and wherein the task processing unit acquires from the memory the data that is returned in response to the data transmission.

11. The information processing system according to claim 10, wherein the request processing unit, which performs the original data transmission, receives the data returned by the other processor unit from the other processor unit and stores the data in the memory.

* * * * *